United States Patent
Hattori et al.

(10) Patent No.: US 6,902,674 B2
(45) Date of Patent: Jun. 7, 2005

(54) TREATING METHOD FOR COATING MATERIAL WASTE WATER

(75) Inventors: Tadamasa Hattori, Hiratsuka (JP); Masahide Kawaraya, Hiratsuka (JP); Osamu Isozaki, Yokohama (JP); Naonori Miyata, Chigasaki (JP)

(73) Assignee: Kansai Paint Co., Ltd., Hyogo-Ken (JP)

(*) Notice: Subject to any disclaimer, the term of this patent is extended or adjusted under 35 U.S.C. 154(b) by 155 days.

(21) Appl. No.: 10/602,591

(22) Filed: Jun. 25, 2003

(65) Prior Publication Data

US 2004/0104168 A1 Jun. 3, 2004

(30) Foreign Application Priority Data

Jun. 25, 2002 (JP) .......................... 2002-183803
Aug. 23, 2002 (JP) .......................... 2002-242869

(51) Int. Cl.⁷ .................................................. C02F 3/00
(52) U.S. Cl. ...................... 210/615; 210/620; 210/631; 210/723; 210/748
(58) Field of Search ................... 210/615, 616, 210/617, 620, 631, 723, 748

(56) References Cited

U.S. PATENT DOCUMENTS 6,139,744 A * 10/2000 Spears et al. .............. 210/614

FOREIGN PATENT DOCUMENTS

| EP | 1 138 635 | 10/2001 |
| JP | 8-155308 | 6/1996 |
| JP | 2000-263056 | 9/2000 |
| JP | 2001-259620 | 9/2001 |
| JP | 2002-336850 | 11/2002 |

\* cited by examiner

*Primary Examiner*—Chester T. Barry
(74) *Attorney, Agent, or Firm*—Wenderoth, Lind & Ponack, L.L.P.

(57) ABSTRACT

Provided is an efficient treating method for coating material waste water which meets a change in a concentration of contaminants contained in waste water and a change in a treating amount by converting scarcely decomposable substances contained in the coating material waste water to easily decomposable substances. The coating material waste water is irradiated with a micro wave to decompose organic substances contained in the above waste water. Further, the coating material waste water before irradiated with a micro wave may be subjected, if necessary, to coagulation treatment by a flocculant or electrolytic treatment. After irradiating with a micro wave to decompose scarcely decomposable substances contained in the waste water to easily decomposable substances, the resulting treated water is preferably fed to a biological reaction bath and subjected to biological treatment under aerobic or anaerobic atmosphere.

8 Claims, 1 Drawing Sheet

TREATING METHOD FOR COATING MATERIAL WASTE WATER

BACKGROUND OF THE INVENTION

1. Field of the Invention

The present invention relates to a treating method for coating material waste water.

2. Description of the Prior Art

It has so far been usual that a flocculant is added to coating material waste water discharged from coating plants and coating material production plants in order to separate and remove quickly and efficiently coating materials contained therein to thereby coagulate and separate (floating or settling) the coating materials to remove them and that this coagulated and separated waste water is then subjected to biological treatment under aerobic atmosphere. In biological treatment, however, microorganisms are limited in a decomposition capacity. Accordingly, various methods such as an ozone decomposition method, a Fenton method and UV irradiation method have so far been developed in order to convert contaminants contained in waste water into substances which are liable to be decomposed by microorganisms. For example, a treating method in which waste water containing organic substances is irradiated with a UV ray and/or a visible ray in the presence of a photooxidation catalyst to thereby oxidize and decompose the organic substances is disclosed in Japanese Patent Application Laid-Open No. 155308/1996, and a method in which organic substances in water are irradiated with a UV ray and a micro wave at the same time in the presence of a photooxidation catalyst to thereby oxidize and decompose the organic substances is disclosed in Japanese Patent Application Laid-Open No. 259620/2001. Further, a method in which organic substances are separated and removed by applying high voltage and emitting an electromagnetic wave of a high frequency is disclosed in Japanese Patent Application Laid-Open No. 263056/2000 (WO00/56663 and EP1138635), and a method in which nitrate nitrogen in water is irradiated with a micro wave in the presence of a specific solid catalyst to thereby remove the nitrate nitrogen is disclosed in Japanese Patent Application Laid-Open No. 336850/2002.

However, it is difficult to sufficiently decompose contaminants by these methods, and when the contaminants have a high concentration or a treating amount grows large, a UV ray is absorbed in organic substances, so that substances which are not decomposed are likely to remain in final treated water.

An object of the present invention is to provide a method for treating efficiently coating material waste water by converting scarcely decomposable substances contained in coating material waste water into easily decomposable substances.

SUMMARY OF THE INVENTION

Intensive researches repeated by the present inventors in order to solve the problems described above have resulted in finding that organic substances contained in coating material waste water can be decomposed to convert scarcely decomposable substances into easily decomposable substances by irradiating the above coating material waste water with a micro wave and that the coating material waste water can readily and surely be treated by subjecting resulting treated water to biological treatment, and thus they have come to complete the present invention.

That is, the present invention relates to a treating method for coating material waste water characterized by irradiating coating material waste water with a micro wave to decompose organic substances contained in the above waste water and a treating method for coating material waste water characterized by irradiating coating material waste water with a micro wave to decompose scarcely decomposable substances contained in the waste water to easily decomposable substances and then feeding resulting treated water to a biological reaction bath to subject it to biological treatment under aerobic or anaerobic atmosphere.

DESCRIPTION OF THE SPECIFIC EMBODIMENTS

Figure 1:
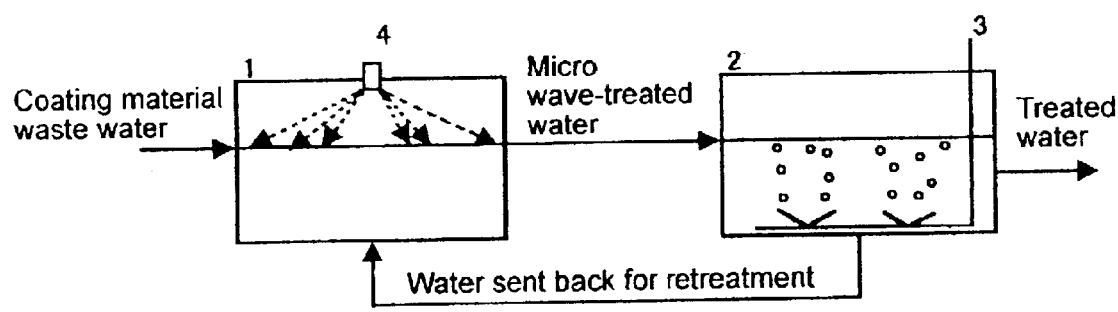
FIG. 1 is a waste water treating flow diagram explaining the suitable embodiment of the present invention.

The treating method for waste water according to the present invention shall be explained below in further details.

The waste water in the present invention includes, for example, coating booth water in coating lines for automobiles and auto-body shops and industrial waste water coming from coating material production plants.

Various pigments, organic resins, cross-linking agents and organic solvents which originate principally in coating materials are contained in these waste waters, and the compositions and the contents thereof are varied depending on plants and time and are not fixed. To give, for example, one example of waste water in a coating line for automobiles, the compositions were 1 to 100 g/liter of precipitates, 1,000 to 10,000 mg/liter of $COD_{Mn}$, 1,000 to 15,000 mg/liter of TOC, 1,000 to 5,000 mg/liter of BOD and 1 to 10,000 mg/liter of organic solvents, wherein $COD_{Mn}$ means a chemical oxygen demand; TOC means a total organic carbon; and BOD means a biochemical oxygen demand. The organic solvent includes, for example, water soluble ether base and alcohol base solvents.

The coating material waste water described above is subjected preferably, if necessary, to coagulation and separation treatment by adding a flocculant or electrolytic treatment in any step before and after irradiating with a micro wave. Excluding specific cases where contaminants have a very low concentration and where scarcely decomposable substances are hardly contained, treated water is obtained preferably by carrying out first coagulation and separation treatment particularly before irradiating with a micro wave to separate and remove sludges from the above coating material waste water by floating or settling and separating.

Capable of being given as the flocculant are inorganic flocculants represented by aluminum sulfate, polyaluminum chloride and ferric chloride, low molecular flocculants such as surfactants and anionic, weakly anionic, nonionic or cationic high molecular flocculants. They can be used alone or in combination of plural kinds thereof, according to the type of waste water.

The electrolytic treatment is a method in which electrodes are put in waste water to apply an electric current and in which fine bubbles of oxygen and hydrogen produced by electrolysis of water are used to adsorb pigments and resins contained in the waste water and those substances are collected on the surface of the waste water by virtue of a buoyancy, and it is effective as well if combined with treatment by a flocculant. In the electrolytic treatment, usually an electrolyte is added and dissolved in fed waste water, and plural electrodes are arranged in a water bath thereof in a suitable space to apply an electric current between the electrodes, whereby electrolysis is carried out. This allows the waste water to be coagulated. Suitably used are an aluminum electrode as the electrode and sodium nitrate and sodium chloride as the electrolyte.

In the present invention, coagulated matters are removed by settling and filtering as described above, and then a hydrophilic organic solvent and a water soluble organic resin which can not be removed by the above coagulation and separation treatment are decomposed by irradiating with a micro wave. When biological treatment is carried out as an after step, scarcely decomposable substances are subjected to treatment for preliminarily decomposing to easily decomposable substances by irradiating with a micro wave, and decomposition treatment is further carried out by the biological treatment.

A micro wave is an electromagnetic wave having a wavelength of 0.1 to 1,000 mm and includes UHF (decimeter wave), SHF (centimeter wave), EHF (millimeter wave) and a submillimeter wave. A frequency of 2450 MHz which is internationally allocated for industrial use is used in many cases, but it shall not be restricted thereto. The micro wave used in the present invention is generated by means of a micro wave generator used for an electronic oven, and it is irradiated to coating material waste water subjected, if necessary, to coagulation and separation treatment. The irradiation time can suitably be selected according to a concentration of organic substances contained in waste water and an intensity of irradiated light, and usually it is preferably 1 to 60 minutes.

Waste water is heated by irradiation of a micro wave, and usually the higher the temperature is, the more the decomposition rate of organic substances is elevated, so that the waste water does not have to be cooled as long as hazards on works such as boiling of the waste water and volatilization of an organic solvent are not expected. The waste water may further be heated in order to raise the decomposition efficiency.

It is not economically preferred to decompose organic substances to harmless ones only by irradiation of a micro wave, and it is effective to use irradiation of a micro wave as a preliminary means for decomposing organic substances. For example, in carrying out wet oxidation treatment using a specific solid catalyst under feeding oxygen-containing gas, a micro wave can be irradiated.

Publicly known compounds can be used as the solid catalyst without any specific restrictions, and capable of being used are, for example, insoluble or scarcely soluble compounds of metal elements selected from titanium, silicon, zirconium, manganese, iron, cobalt, nickel, tungsten, cerium, copper, silver, gold, platinum, palladium, rhodium, ruthenium, iridium and alkaline earth metals such as calcium, for example, particles of oxides, hydroxides or double oxides thereof or inorganic oxides carried thereon with these metals, activated carbon and zeolite.

In the present invention, biological treatment can be carried out, if necessary, in any step before and after irradiating with a micro wave. The biological treatment is suitably carried out particularly after a part or all of scarcely decomposable substances contained in waste water is decomposed to easily decomposable substances which are liable to be taken in by organisms by irradiating with the micro wave described above. This makes it possible to raise the biological treatment efficiency to a large extent as compared with a case where the micro wave is not irradiated.

The biological treatment can be carried out by methods which have so far publicly been known, for example, an activated sludge method and a carrier-throwing type biological treating method, and the latter biological treating method using a microorganism-fixed carrier is particularly preferred.

In the carrier-throwing type biological treating method described above, an organic or inorganic carrier is used, and a microorganism is carried on the above carrier. This microorganism decomposes organic substances contained in waste water, and this method is more efficient than an activated sludge method. The form of the carrier may be any ones including specific forms such as a plate, a fiber and a cylinder, a sponge, a particle and a mass, and a fine particle in which a fluidity and a surface area are liable to be secured is preferred. A material of the carrier includes, for example, photo-curing resins, polyurethane, polyvinyl alcohol, polyethylene, polyacrylamide, polyester, polypropylene, agar, alginic acid, carrageenan, cellulose, dextran, agarose, ion exchange resins, granulated active carbon, crushed active carbon, charcoal, zeolite, mica, sand grains, porous ceramics such as silica gel, anthracite and substances obtained by mixing the resin carriers described above with activated carbon. They can be used in combination. The carrier has suitably a particle diameter of 0.3 to 15 mm, preferably 0.5 to 10 mm from the viewpoint of easiness in handling and an effective surface area.

When the carrier-throwing type biological treating method described above is carried out under aerobic atmosphere, pure oxygen or oxygen-containing gas is fed into a biological treating bath or an oxygen-dissolving bath is disposed, and waste water in which oxygen is dissolved almost to a saturation state in the bath is fed into a biological treating bath.

On the other hand, in biological treatment under anaerobic atmosphere, denitrification treatment using denitrifying bacteria can be carried out. In the biological treatment according to the present invention, the biological treatment under aerobic atmosphere can be used in combination with the biological treatment under anaerobic atmosphere, and it is possible to, for example, carry out the biological treatment under anaerobic atmosphere after the biological treatment under aerobic atmosphere or carry out the biological treatment under aerobic atmosphere after the biological treatment under anaerobic atmosphere or circulate these treatments.

The microorganisms used for the biological treatment may suitably be selected from aerobic bacteria and anaerobic bacteria which have so far publicly been known. The aerobic bacteria include, for example, a *Pseudomonas* genus and an *Acetobacter* genus. Further, the anaerobic bacteria include, for example, denitrifying bacteria represented by a *Pseudomonas* genus, methane bacteria and a *Clostridium* genus.

The biological treatment described above can be carried out on the conditions of a treating temperature of 10 to 40° C., a pH of 6.0 to 9.0 and a hydraulic retention time (HRT) of 24 to 48 hours.

In the present invention, it is possible, if necessary, to suitably use in combination the other waste water treating apparatuses, for example, an ozone decomposition treating apparatus, a UV treating apparatus and an adsorption treating apparatus with activated carbon.

Hereinafter, the suited embodiment of the present invention shall be explained below with reference to the drawing.

FIG. 1 is a flow diagram showing one embodiment of the method of the present invention. Coating material waste water subjected, if necessary, to coagulation and separation treatment is fed to a micro wave treating bath 1 having a micro wave irradiating apparatus 4 to irradiate the above waste water with the micro wave. The resulting micro wave-irradiated waste water is introduced into a biological decomposition bath 2 having a gas diffusing tube 3 and subjected to biological treatment under aerobic atmosphere. A part of the treated waste water is sent back to the treating bath 2, and a part thereof is taken out as treated water. A concentration of $COD_{Mn}$ or TOC of the treated water taken out can be controlled by controlling the amount sent back to the treating bath 2. The treated water taken out is passed through an activated carbon treating bath and then discharged.

The present invention shall more specifically be explained below with reference to examples and comparative examples.

EXAMPLE 1

Coating material waste water of a water based coating material for automobiles was used as coating material waste water. The above coating material waste water (A) had a $COD_{Mn}$ of 8,500 mg/liter and a TOC of 11,000 mg/liter. Added to one liter of this coating material waste water (A) and stirred were 15,000 mg of a flocculent KURISTUCK B100 (manufactured by Kurita Water Industries Ltd.) and 15,000 mg of KURISTUCK B450 (manufactured by Kurita Water Industries Ltd.), and then the mixture was left standing for one day to remove coagulated matters. A treated liquid (B) obtained after this coagulation treatment had a $COD_{Mn}$ of 5,800 mg/liter and a TOC of 6,800 mg/liter. The above treated liquid (B) was irradiated with a micro wave (frequency: 2.45 GHz and output: 500 W) for 5 minutes.

Next, the resulting micro wave-treated water was put into a biological reaction bath and subjected to biological treatment on the conditions of a treating temperature of 20 to 25° C., a pH of 7 to 8.5 and a hydraulic retention time of 48 hours using an activated sludge having aerobic bacteria of a *Pseudomonas* genus, an *Acetobacter* genus, a *Rhodococcus* genus, a *Batillus* genus, a *Candida* genus and a *Fussarium* genus, and then biologically treated water was filtered. The resulting treated water (C) had a $COD_{Mn}$ of 1,300 mg/liter and a TOC of 1,750 mg/liter.

EXAMPLE 2

Treatments were carried out in the same manner as in Example 1, except that in Example 1, a micro wave (millimeter wave) having a frequency of 200 GHz and an output of 500 W was irradiated for 5 minutes in place of irradiating with the micro wave having a frequency of 2.45 GHz and an output of 500 W for 5 minutes. The resulting treated water (C) had a $COD_{Mn}$ of 900 mg/liter and a TOC of 1,200 mg/liter.

EXAMPLE 3

The treated liquid (B) obtained after the coagulation and separation treatment which was used in Example 1 was irradiated with a micro wave (frequency: 2.45 GHz and output: 500 W) for 5 minutes.

Next, the resulting micro wave-treated water was put into a biological reaction bath and subjected to biological treatment on the conditions of a treating temperature of 20 to 25° C., a pH of 7 to 8.5 and a hydraulic retention time of 48 hours using spherical (diameter:4 mm) "KP Pearl" (carrier comprising polyethylene glycol as a principal component, manufactured by Kansai Paint Co., Ltd.) on which stuck and fixed are aerobic bacteria of a *Pseudomonas* genus, an *Acetobacter* genus, a *Rhodococcus* genus, a *Batillus* genus, a *Candida* genus and a *Fussarium* genus, and then biologically treated water was filtered. The resulting treated water (C) had a $COD_{Mn}$ of 1,300 mg/liter and a TOC of 1,600 mg/liter.

EXAMPLE 4

Treatments were carried out in the same manner as in Example 1, except that in Example 1, the coagulation and separation treatment was not carried out. The resulting treated water (C) had a $COD_{Mn}$ of 4,000 mg/liter and a TOC of 5,000 mg/liter.

COMPARATIVE EXAMPLE 1

Treatments were carried out in the same manner as in Example 1, except that in Example 1, the micro wave was not irradiated. The resulting treated water (C) had a $COD_{Mn}$ of 2,000 mg/liter and a TOC of 2,500 mg/liter.

COMPARATIVE EXAMPLE 2

Treatments were carried out in the same manner as in Example 1, except that in Example 1, a UV ray was irradiated for 5 minutes by means of a 500 W xenon lamp in place of irradiating with the micro wave. The resulting treated water (C) had a $COD_{Mn}$ of 2,000 mg/liter and a TOC of 2,500 mg/liter.

COMPARATIVE EXAMPLE 3

Treatments were carried out in the same manner as in Example 4, except that in Example 4, the micro wave was not irradiated. The resulting treated water (C) had a $COD_{Mn}$ of 4,700 mg/liter and a TOC of 5,800 mg/liter.

The results of the waste water treating experiments carried out in the examples and the comparative examples each described above are summarized in the following Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Coagulation treatment | Present | Present | Present | None | Present | Present | None |
| Electromagnetic treatment | Micro wave | Micro wave (mm. wave) | Micro wave | Micro wave | None | UV ray | None |
| Biological treatment | Activated sludge treatment | Activated sludge treatment | Fixed carrier treatment | Activated sludge treatment | Activated sludge treatment | Activated sludge treatment | Activated sludge treatment |

TABLE 1-continued

|  | Example | | | | Comparative Example | | |
| --- | --- | --- | --- | --- | --- | --- | --- |
|  | 1 | 2 | 3 | 4 | 1 | 2 | 3 |
| $COD_{Mn}$ (mg/l) | 1,300 | 900 | 1,300 | 4,000 | 2,000 | 2,000 | 4,700 |
| TOC (mg/l) | 1,750 | 1,200 | 1,600 | 5,000 | 2,500 | 2,500 | 5,800 |

According to the method of the present invention, decomposition of organic substances contained in coating material waste water can be promoted by irradiating with a micro wave. In particular, scarcely decomposable organic substances contained in the coating material waste water can efficiently be decomposed by irradiating with a micro wave as a pre-treatment for biological treatment, and it is very useful for treatment of coating waste water and coating material waste water.

What is claimed is:

1. A treating method for coating material waste water characterized by irradiating coating material waste water with a micro wave to decompose scarcely decomposable substances contained in the waste water to easily decomposable substances and then feeding the resulting treated water to a biological reaction bath to subject it to biological treatment under aerobic or anaerobic atmosphere.

2. The treating method for coating material waste water as described in claim 1, wherein the micro wave is irradiated for 1 to 60 minutes.

3. The treating method for coating material waste water as described in claim 1, wherein a microorganism-fixed carrier is used in the biological treatment.

4. The treating method for coating material waste water as described in claim 1, wherein coagulation and separation treatment by a flocculant or electrolytic treatment is carried out before the coating material waste water is irradiated with a micro wave.

5. The treating method for coating material waste water as described in claim 2, wherein a microorganism-fixed carrier is used in the biological treatment.

6. The treating method for coating material waste water as described in claim 2, wherein coagulation and separation treatment by a flocculant or electrolytic treatment is carried out before the coating material waste water is irradiated with a micro wave.

7. The treating method for coating material waste water as described in claim 3, wherein coagulation and separation treatment by a flocculant or electrolytic treatment is carried out before the coating material waste water is irradiated with a micro wave.

8. The treating method for coating material waste water as described in claim 5, wherein coagulation and separation treatment by a flocculant or electrolytic treatment is carried out before the coating material waste water is irradiated with a micro wave.

* * * * *